G. W. KLOCK.
LAWN MOWER.
APPLICATION FILED JAN. 21, 1910.
1,013,182.
Patented Jan. 2, 1912.
2 SHEETS—SHEET 1.
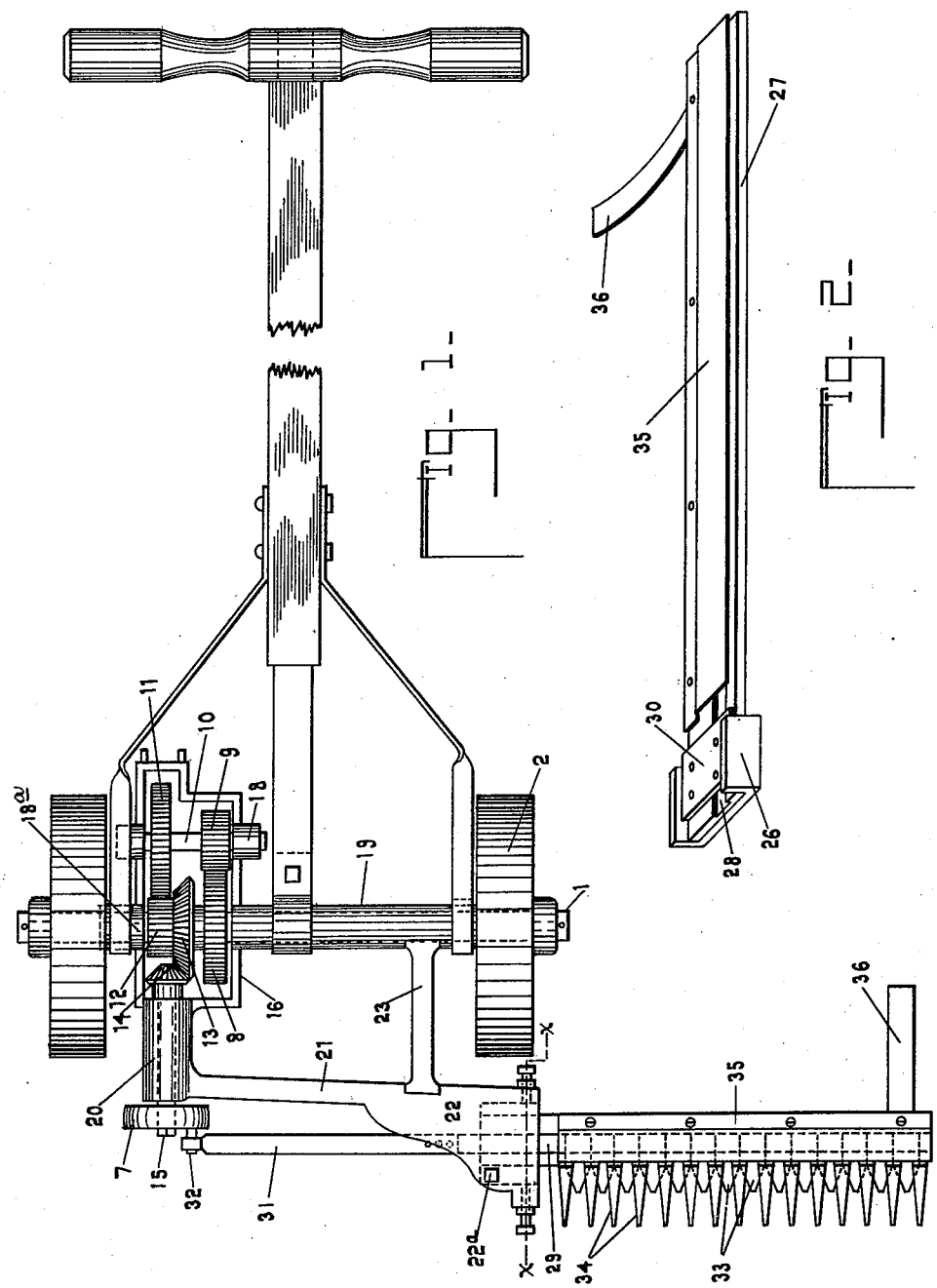
WITNESSES:
INVENTOR
George W. Klock
BY
ATTORNEY

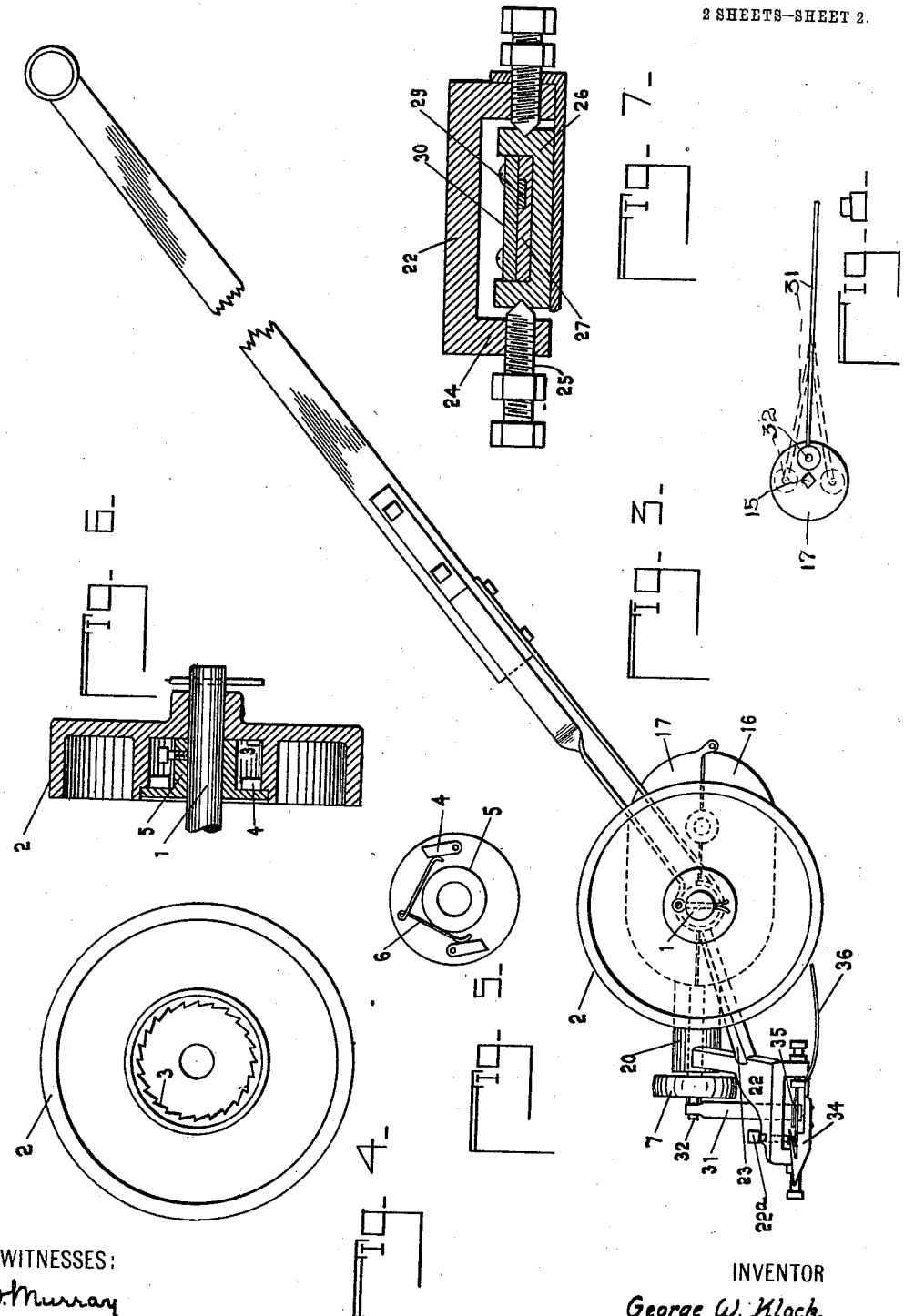

UNITED STATES PATENT OFFICE.

GEORGE W. KLOCK, OF CHILLICOTHE, TEXAS.

LAWN-MOWER.

1,013,182.   Specification of Letters Patent.   Patented Jan. 2, 1912.

Application filed January 21, 1910. Serial No. 539,263.

*To all whom it may concern:*

Be it known that I, GEORGE W. KLOCK, a citizen of the United States, residing at Chillicothe, in the county of Hardeman and State of Texas, have invented certain new and useful Improvements in Lawn-Mowers, of which the following is a specification.

My invention relates to new and useful improvements in lawn-mowers, and more particularly in that class of lawn-mowers, which employ a reciprocating sickle-bar as the grass cutting means. Its object is to provide a lawn-mower, having a reciprocating sickle bar, actuated through a spring pitman by a crank disk which is operated from the mower axle by a suitable train of gears.

A further object is to provide the gears with a suitable housing, to prevent their becoming clogged with grass or dirt.

A still further object is to provide a dog and ratchet wheel mechanism, which will communicate rotation from the mower wheels to the axle, during forward motion of the machine, but will be inoperative during rearward motion.

Finally, the object of the invention is to provide a device of the character described, that will be strong, durable, simple and efficient, and comparatively easy to construct, and also one in which the various parts will not be likely to get out of working order.

With these and various other objects in view my invention has relation to certain novel features of construction and operation, an example of which is described in the following specification, and illustrated in the accompanying drawings, wherein;

Figure 1 is a top view of the lawn-mower, complete with the exception that the hinged cover of the gear housing is not shown, and a portion of the mower-handle is broken away. Fig. 2 is an isometric view of the sickle frame, the sickle bar and guards being removed therefrom. Fig. 3 is a side elevation of the lawn-mower complete except that a portion of its handle is again broken away. Fig. 4 is an inside view of one of the transporting wheels, showing an internal ratchet gear carried by said wheel. Fig. 5 illustrates a flanged set collar adapted to be secured to the axle adjacent to each wheel and carrying a pair of spring-pressed dogs upon its flanges adapted to engage the teeth of the aforesaid internal ratchet gear. Fig. 6 is a transverse sectional view of one of the transporting wheels and the set collar carrying dogs to mesh with the ratchet teeth of the wheel, the two being shown mounted on the axle extremity. Fig. 7 is a vertical sectional view taken on the line *x—x* of Fig. 1, showing the manner of supporting the sickle frame from the main frame of the mower. Fig. 8 is a front elevation of the spring pitman connected to the crank disk and showing the pitman as sprung or bent.

Referring now more particularly to the drawings wherein like numerals of reference designate similar parts in all the figures, the numeral 1 denotes the axle of the mower and 2 the transporting wheels, loose upon said axle at each extremity. In order to communicate rotation to the axle from the transporting wheels during the forward motion of the mower, and to prevent the communication of rotation during the rearward motion thereof, dog and ratchet mechanisms are provided connecting the wheels and axle. An internal ratchet gear 3 is provided upon the inner side of each wheel and a pair of dogs 4 carried upon the flange of a set-collar 5, fast upon the axle, mesh with each ratchet gear. A spring 6, mounted upon the flange of each collar 5, holds each pair of dogs in mesh with their respective ratchet wheel.

Rotation is communicated from the mower axle to the crank-disk 7, by a train of gearing, adapted to give the relatively high velocity of rotation to said crank-disk, which is required. A spur-gear 8 fast upon the mower axle meshes with a spur-pinion 9, fast upon a counter-shaft 10. A spur-gear 11, fast upon the counter-shaft 10, meshes with a spur-pinion 12 which is loose upon the mower-axle. A bevel gear 13, rigidly attached to the pinion 12, meshes with a bevel pinion 14, fast upon the shaft 15, which carries the crank-disk 7.

The above described train of gear is protected by a housing, consisting of a stationary under casing 16, and a hinged cover 17. Bearings 18 for the counter-shaft 10 are provided in the casing 16, integral therewith. A short sleeve 18ª and a long sleeve 19 extend from the casing 16 at each side thereof to receive the mower-axle, and a bearing 20 projects integrally from the front of said casing to receive the shaft 15. From the bearing 20 an arm 21 extends, having an enlarged portion 22 at its extremity. A brace 23 connects the sleeve 19 with the portion 22. The portion 22 is provided with downwardly extending side walls 24, in which are mounted pivotal screws 25. The extremities of these screws enter recesses in the sides of a casting 26 of U-shaped cross section. To the casting 26, is rigidly secured the extremity of an elongated bar 27, containing a longitudinal slot 28 to receive the sickle bar 29. A plate 30 secured to the bar 27 between the upright arms of the casting 26 prevents upward displacement of the sickle bar. A set screw 22ª, vertically mounted in the enlarged portion 22, bears upon the inner portion of the casting 26. By means of the set-screw the sickle frame, which is rigidly secured to the casting 26, may be adjusted at various angles with the horizontal. This feature is of utility when the lawn-mower is being run along at the foot or the top of a hill, and it is necessary to incline the sickle up or down. A pitman 31 of resilient construction has one of its extremities rigidly secured to the bar 29, and the other end is pivotally secured to the crank-pin 32 of the crank-disk 7. The resiliency of the pitman permits the necessary vertical play between itself and the bar 29. A plurality of adjacent knife blades 33 project forwardly from the bar 29, and a number of guard fingers 34 secured to the underside of the bar 27 act in conjunction with the blades. An elongated guard plate 35 secured to the rear portion of the bar 27 projects over the sickle bar preventing grass or dirt from entering the slot 28 and impeding the movement of the sickle. From the outer extremity of the bar 27, a curved bar 36 extends rearwardly, furnishing a support for the sickle bar and its adjuncts.

When the above described device is being taken to or from work, it may be drawn rearwardly, so that the dog and ratchet mechanisms will not communicate rotation from the wheels to the axle.

I am aware that changes may be made in the form and proportions of parts and details of construction of the device herein described as a preferable embodiment to my invention without departing from the spirit or sacrificing the advantages thereof, and I therefore reserve the right to make such changes and alterations in said device as fairly come within the scope of the following claim:

What I claim is:—

A lawn-mower comprising the combination with a frame, of an axle carried by the frame, wheels on the axle, a bearing sleeve extending forwardly from the frame, a shaft rotatably mounted in the bearing sleeve, and operatively driven from the axle, a crank disk secured to the forward end of the shaft, a lateral arm extending from the bearing sleeve, a brace between the arm and the frame, said arm having down turned side portions at its extremity forming an inverted U-shaped member, set screws engaged through said down-turned portions in opposed directions, a U-shaped casting having recesses in its sides engaged by the set screws, a plate secured to said casting and extending outwardly therefrom for pivotal movement upon said set screws, said plate having a longitudinal groove in its upper surface, guard fingers carried by the plate, a sickle bar slidable in the groove and having cutting edges coacting with the guard fingers, a pitman connecting the crank disk to the sickle bar, a casing secured to the plate and extending over the bar and means for inclining the bar and frame in different adjusted positions at their inner ends.

In testimony whereof I have signed my name to this specification in the presence of two subscribing witnesses.

GEORGE W. KLOCK.

Witnesses:
S. N. MITCHELL,
TOM E. ROSE.

---

Copies of this patent may be obtained for five cents each, by addressing the "Commissioner of Patents, Washington, D. C."